United States Patent [19]

Kuntz

[11] Patent Number: 5,229,144
[45] Date of Patent: Jul. 20, 1993

[54] INJECTION MOLDING APPARATUS

[76] Inventor: Dieter E. Kuntz, 16 Morning Glory, Irvine, Calif. 92715-3714

[21] Appl. No.: 682,476

[22] Filed: Apr. 9, 1991

[51] Int. Cl.$^5$ .............................................. B29C 45/02
[52] U.S. Cl. .............................. 425/557; 264/328.19; 425/562; 425/564; 425/566; 425/574
[58] Field of Search .............. 425/546, 584, 549, 562, 425/563, 564, 566, 574, 585, 586, 557, 558, 559, 561, DIG. 60; 264/328.19

[56] References Cited

U.S. PATENT DOCUMENTS 3,936,259  2/1976  Hofer et al. ........................... 425/574
4,752,207  6/1988  Kaaden ................................ 425/549

FOREIGN PATENT DOCUMENTS 3168323  7/1988  Japan ................................... 425/586

Primary Examiner—Tim Heitbrink
Attorney, Agent, or Firm—Harvey C. Nienow

[57] ABSTRACT

Apparatus for injection of fluids as, for instance, into a mold for the making of parts out of plastic or the like wherein the apparatus is self-aligning with the opening of the mold, a nozzle being moveable substantially automatically as the injection apparatus is moved into the inlet of the mold. The apparatus further includes a device for injecting a precise volume of such fluid, there being means for quickly and easily disassembling the entire injection apparatus for purposes of cleaning or repair.

5 Claims, 4 Drawing Sheets

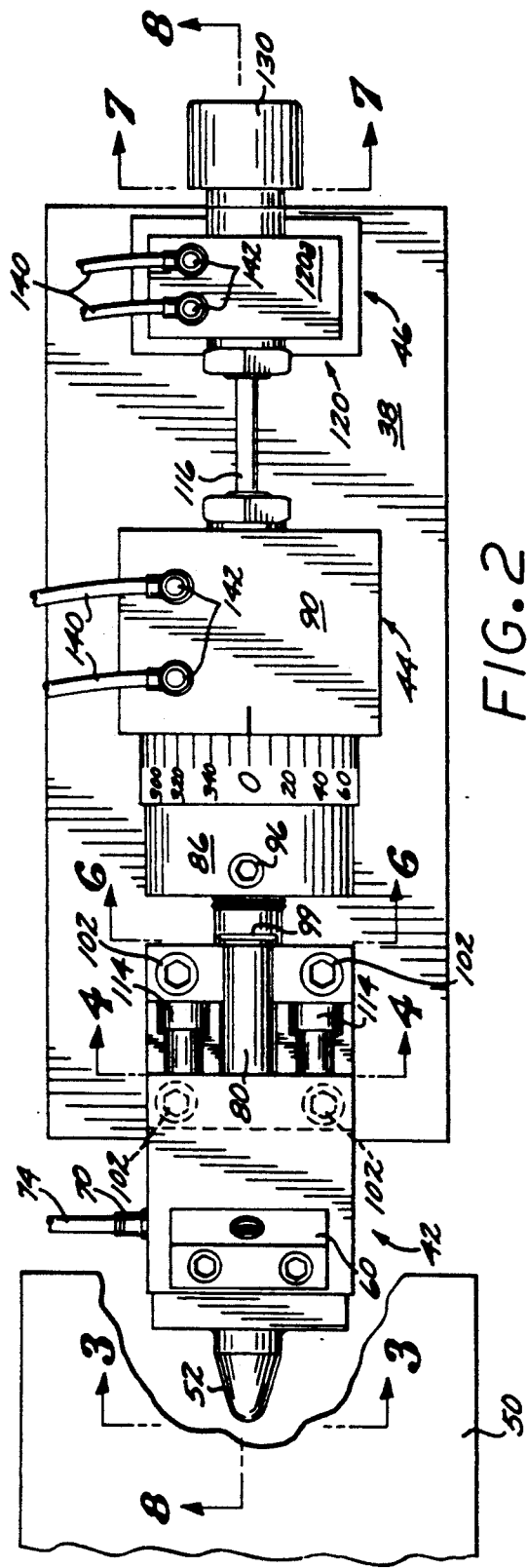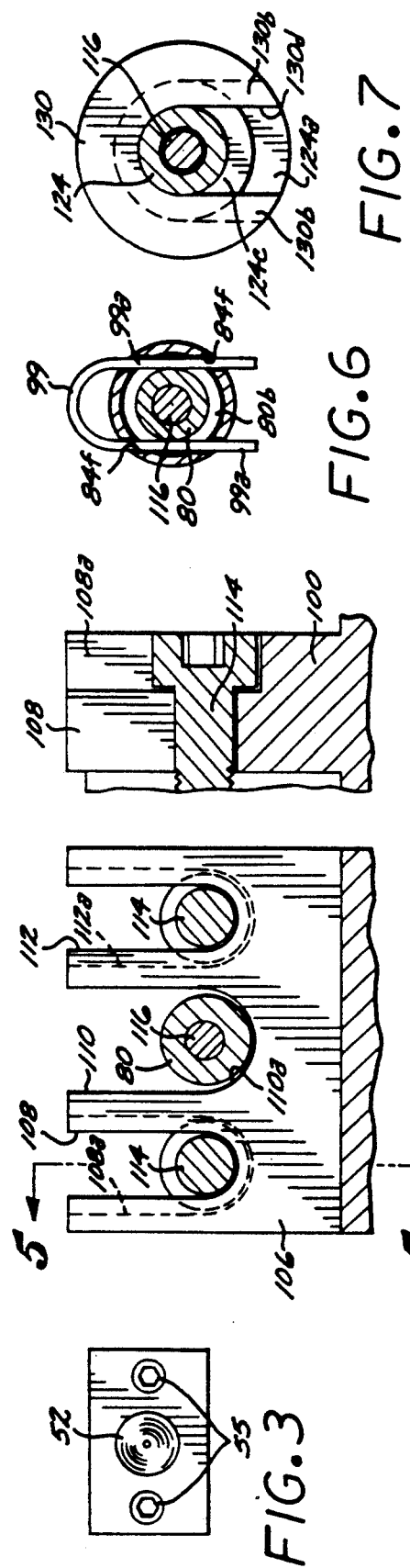

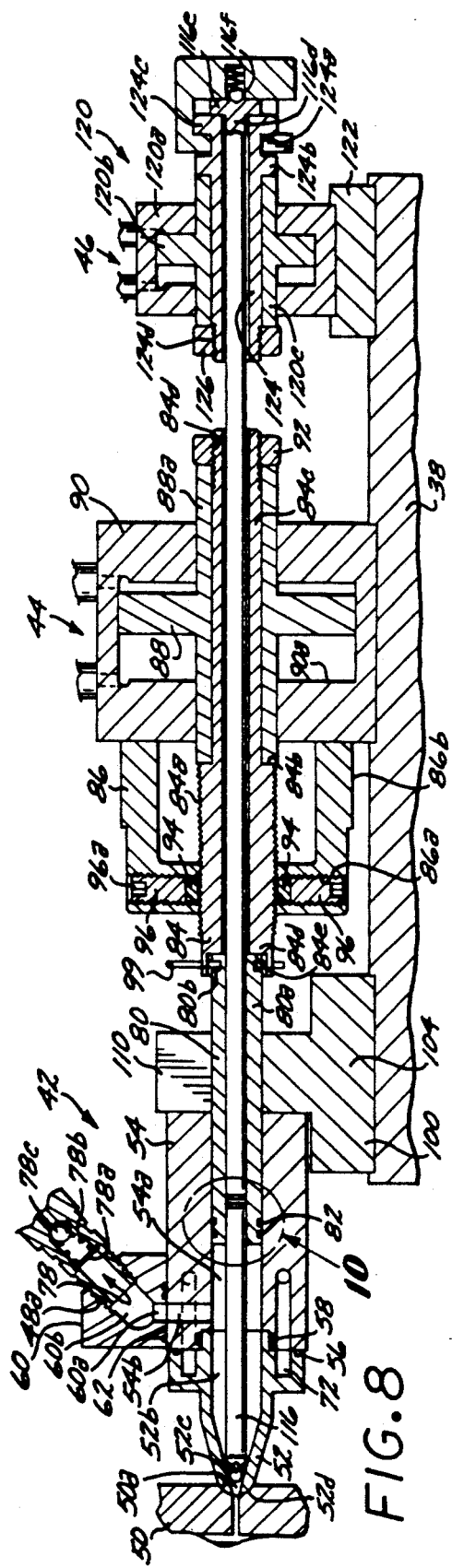
FIG. 8
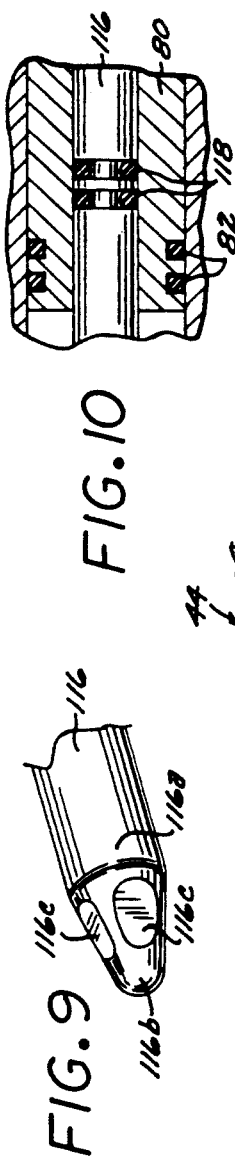
FIG. 10
FIG. 9
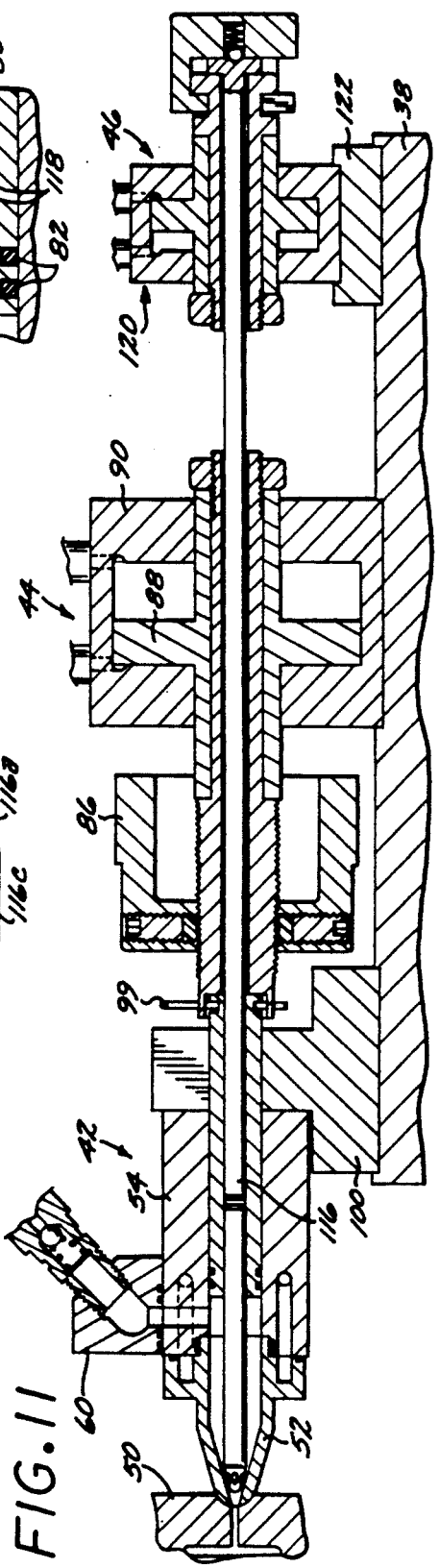
FIG. 11

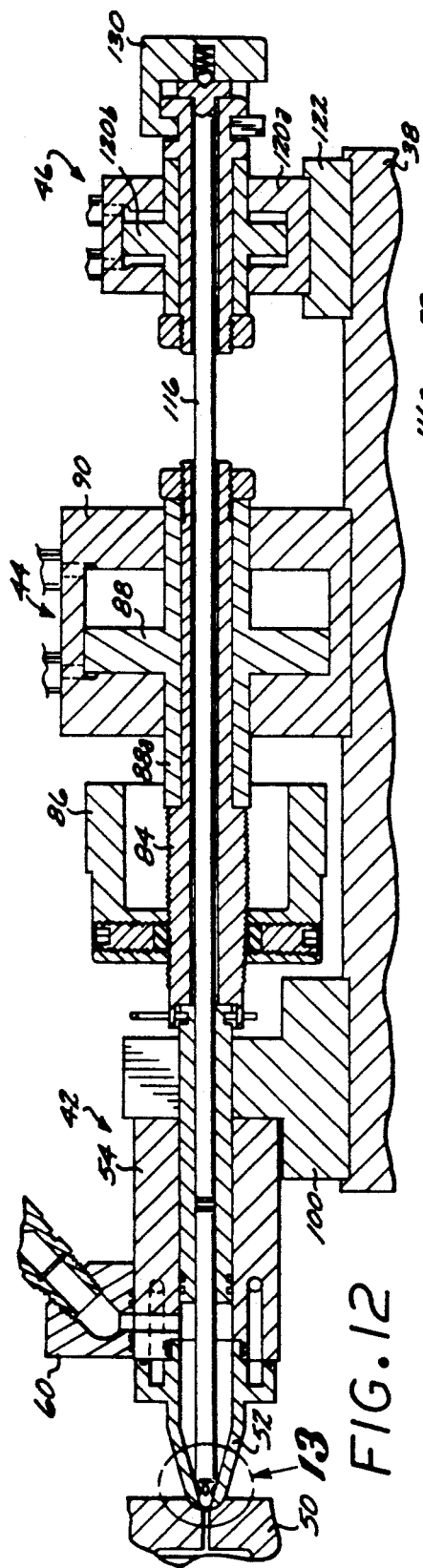
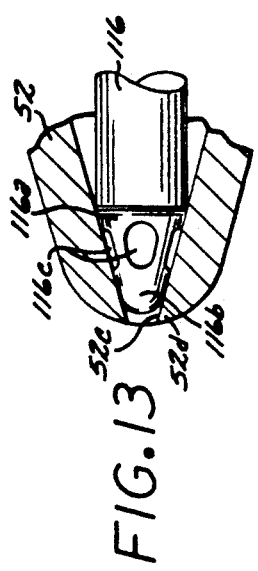
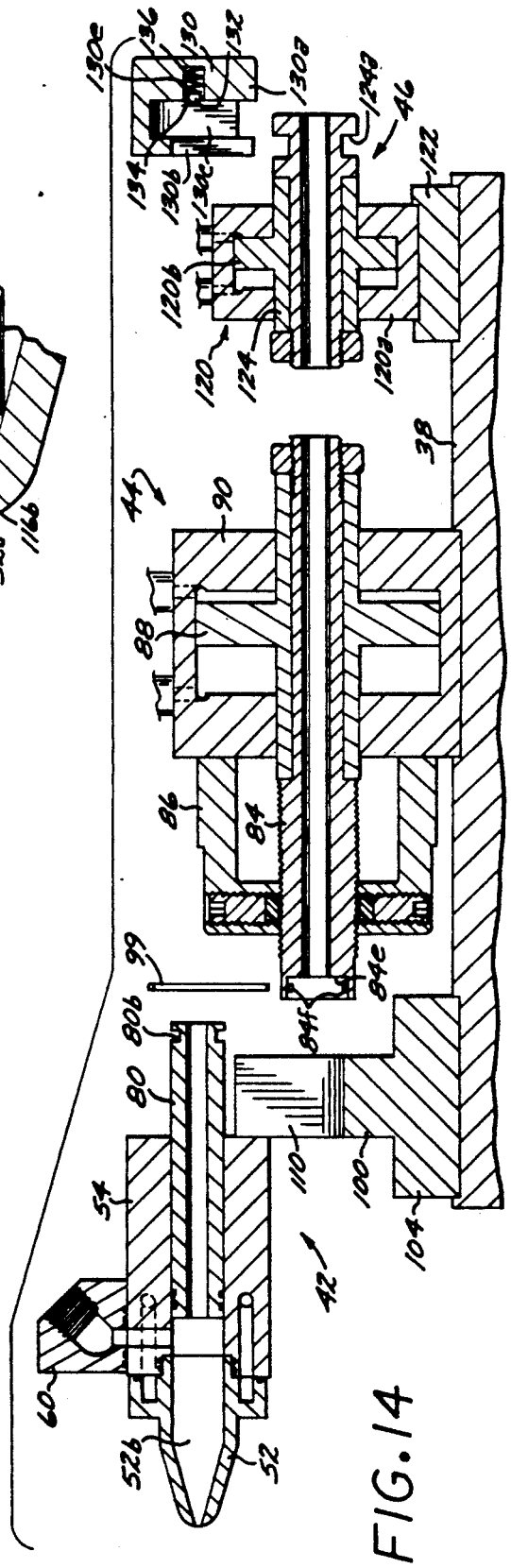
FIG.12
FIG.13
FIG.14

INJECTION MOLDING APPARATUS

The present invention relates generally to means for injecting fluid material into a mold as, for instance, in the case of molding parts of plastic or similar materials, but more particularly, it relates to injection apparatus which can be quickly and easily disassembled for cleaning or repair purposes, and to such apparatus as is self-aligning in that any misalignment between the injection apparatus and the inlet to the mold is self-correcting to insure a good and effective seal therebetween.

BACKGROUND OF THE INVENTION

As is well understood in the art, fluid materials such as plastic resins and silicone are injected into preformed molds such that upon curing of the plastic material, a product or article is formed commensurate with the design of the mold. However, prior injection apparatus has been less than satisfactory in operation because faulty operations can occur which influence the accuracy of injecting the proper volume of material into the mold, and which can cause the loss of part of the materials due to misalignment between the injection apparatus and the inlet to the mold. For a goodly period of time, it has been realized that in order to mold products cheaply and effectively, it is necessary to inject the proper quantity of material within a short period of time and into molds of various different constructions and design.

Considerable effort has heretofore been expended trying to make the mold and injection apparatus compatible so that plastic material or the like is injected into the mold quickly and easily within a short period of time.

OBJECTS OF THE INVENTION

In view of the foregoing, it is an object of the present invention to provide injection apparatus which is substantially self-aligning with respect to virtually any kind of mold.

Another object of the present invention is to provide injection apparatus as characterized above which employs means whereby the injection apparatus is partially moveable with respect to the mold so that any misalignment between the injection nozzle and the mold entrance or inlet can be compensated for by movement of the nozzle.

Another object of the present invention is to provide injection apparatus as characterized above which is virtually automatically operable so that material can be injected into the mold in a quick and efficient manner without dependency upon human operators.

Another object of the present invention is to provide injection apparatus as characterized above which is sealed against leakage of fluids and the like while nonetheless providing automatic relative movement of parts to compensate for any possible misalignment as indicated above.

A still further object of the present invention is to provide injection apparatus as characterized above which can be readily and easily disassembled without the need for the use of tools of either special or ordinary design.

An even still further object of the present invention is to provide injection apparatus as characterized above which can be taken apart by hand by personnel having commonplace physical dexterity or hand-eye coordination.

An even still further object of the present invention is to provide injection apparatus as characterized above which is simple and inexpensive to manufacture and which is rugged and dependable in operation.

BRIEF DESCRIPTION OF THE DRAWINGS

The novel features which I consider characteristic of my invention are set forth with particularlity in the appended claims. The invention itself, however, both as to its organization and mode of operation, together with additional objects and advantages thereof, will best be understood from the following description of specific embodiments when read in combination with the accompanying drawings, in which:

FIG. 2 is a fragmentary top plan view of such apparatus;

FIG. 3 is an elevational view taken substantially along line 3—3 of FIG. 2 of the drawings;

FIG. 4 is a fragmentary sectional view of the apparatus of FIG. 2, taken substantially along line 4—4;

FIG. 5 is a fragmentary sectional view taken substantially along line 5—5 of FIG. 4 of the drawings;

FIG. 6 is a sectional view taken substantially along line 6—6 of FIG. 2 of the drawings;

FIG. 7 is a sectional view taken substantially along line 7—7 of FIG. 2;

FIG. 8 is a fragmentary sectional view taken substantially along line 8—8 of FIG. 2 of the drawings;

FIG. 9 is a fragmentary perspective view of the fluid control rod used in the subject apparatus;

FIG. 10 is a fragmentary sectional view of detail 10 of FIG. 8 of the drawings;

FIG. 11 is a fragmentary sectional view similar to FIG. 8;

FIG. 12 is a fragmentary sectional view of the subject injection apparatus, similar to FIGS. 8 and 11;

FIG. 13 is a fragmentary sectional view of the end of the flow control rod as positioned within the injection nozzle; and FIG. 14 is a fragmentary sectional view showing the subject apparatus partially disasembled.

Like reference characters indicate corresponding parts throughout the several views of the drawings.

DESCRIPTION OF THE PREFERRED EMBODIMENT

Figure 1:
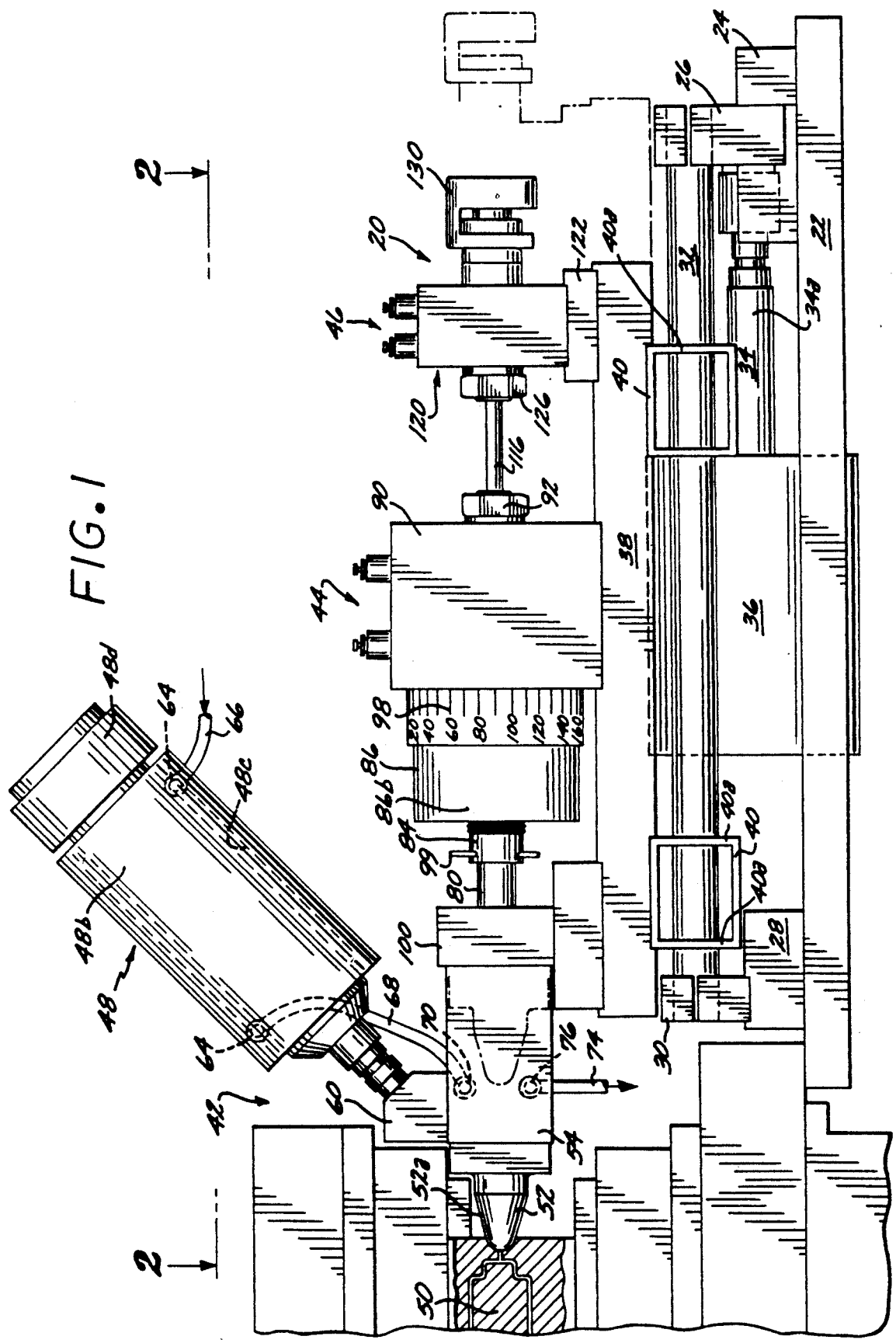
FIG. 1 is a side elevational view of injection apparatus according to the present invention.

Referring to FIG. 1 of the drawings, there is shown therein fluid-injection apparatus 20 according to the present invention. Such apparatus has for its intended purpose the injection of fluid material into a closed chamber such as a mold or other cavity for the purpose of making parts or devices out of metal, plastic or the like. Although the particular apparatus 20 is particularly useful in the making of parts of plastic materials, it is well appreciated that it can be used to advantage in various environments wherein it is necessary to inject a specific quantity of fluid from a reservoir to a specified mold or cavity.

In this regard, it is further appreciated that the subject invention is not dependent upon a particular type of fluid medium or upon a medium of a specified consistency or viscosity, but rather can be applied to advantage in the injecting of substantially any type of material which is broadly defined as fluid, such that it can flow from one place to another under pressure.

The apparatus 20 shown in FIG. 1 of the drawings comprises a stationary platform 22 whereon is mounted, by means of mounting blocks 24, 26, 28 and 30, a pair of cylindrical guide members, one of which is shown at 32. Each of the mounting blocks 24 and 28 is firmly secured to the stationary platform 22, and the mounting blocks 26 and 30 are firmly secured to the blocks 24 and 28, respectively, and have adjustable securing means (not shown) for gripping the ends of the several cylindrical guide members 32.

Also mounted relative to stationary platform 22 is a piston rod 34 having an end 34a secured relative to mounting block 24. The piston carried by piston rod 34 at the end thereof within a pneumatic cylinder 36 is operable, as will hereinafter be explained in further detail, to move cylinder 36 relative to platform 22. To accomplish this, cylinder 36 is provided with suitable conduits or hoses (not shown) for bringing compressed air into the cylinder 36 from an appropriate source thereof. Such conduits or hoses are not shown in the drawings, nor are the control valves or computer for such compressed air because such details are well within the skill of one ordinarily skilled in this particular art.

A moveable platform 38 is firmly secured to pneumatic cylinder 36 for movement therewith, as will be hereinafter explained. Attached to the underside of moveable platform 38 is a pair of rectangularly-shaped guide members 40 having through openings (not shown) formed in opposing sidewalls 40a for slidably receiving the guide members 32. Thus, as will hereinafter be readily apparent, as the pneumatic cylinder 36 is effective in moving platform 38 on guide rods or members 32, the rectangular tubes 40 maintain the movement of platform 38 in a rectilinear direction.

Referring now to various figures of the drawings, there are provided three apparatus sections 42, 44 and 46 which make up the primary apparatus for effectively injecting fluid into a mold or the like.

Apparatus section 42 generally comprises a reservoir 48 of fluid material to be injected into a mold as diagrammatically shown at 50. In addition thereto, there is a nozzle 52 through which is passed fluid from the reservoir 48 into the mold 50. Such nozzle is generally frustoconically shaped, as shown at 52a, and has a hollow interior or cavity 52b as well as a through opening 52c through which the fluid materials are injected into the mold 50. The tip of the frustoconically-shaped nozzle 52 is generally rounded, as at 52d, to be aligned with and to mate with a correspondingly-shaped opening or depression 50a at the inlet to the mold 50.

As shown most particularly in FIGS. 3, 8, 11, 12 and 14 of the drawings, the nozzle 52 is secured to a cylinder member 54 by bolts 55, there being appropriate O-ring sealing members 56 and 58 interposed therebetween within suitable arcuate grooves or openings to prevent fluid flow therebetween except through the cavity 52b of nozzle 52, and the cylindrical interior 54a of member 54.

A mounting block 60 is secured to cylinder member 54 with any appropriate fastening means, there being appropriate O-rings 62 therebetween to properly seal aligned contiguous openings 54b of cylinder 54 and 60a of mounting block 60. A threaded opening 60b which communicates with opening 60a is provided in mounting block 60 to receive the threaded end portion 48a of the reservoir 48.

Referring to FIG. 1 of the drawings, the reservoir 48 comprises a closed container 48b having an end cap 48d, for access to the interior of container 48b, and a hollow jacket 48c formed in the sidewall of the reservoir 48 substantially throughout the length of container 48b.

Suitable fittings 64 are mounted in appropriate openings within the sidewall of reservoir 48 for receiving tubing 66 for conducting a temperature control fluid or medium into the hollow jacket 48c about the interior of the container 48b of reservoir 48. Such cooling medium may be from any appropriate source and after flowing through conduit 66 and the annular space 48c of reservoir 48, flows through another fitting 64 and a conduit 68 to an appropriate fitting 70 in cylinder 54. From here the temperature control medium passes through an annular cavity 72 formed by appropriate contiguously arranged annular openings in nozzle 52 and cylinder 54, as shown in FIGS. 8, 11, 12 and 14. An outlet conduit or hose 74 carries the cooling medium from the nozzle area through a fitting 76.

In the aforementioned manner, the temperature control medium is caused to flow through the reservoir 48 and through nozzle 52 and cylinder 54 so as to maintain the proper working temperature of the apparatus as well as the fluid to be injected into mold 50. The fluid injected into the mold 50 is thereby maintained at the proper fluidity or viscosity so as to flow at the proper velocity under the proper pressure, as will hereinafter be explained in further detail.

A check valve 78 is positioned within the end portion 48a of reservoir 48 to prevent the flow of fluid back into the reservoir while, nonetheless, permitting flow therefrom to the interior cavities of nozzle 52 and cylinder 54. Such check valve 78, as shown in the drawings, comprises a washer-like member 78a firmly secured within the opening of end portion 48a, a compression spring 78b and a flow-prevention ball 78c. Such check valve 78 prevents flow into the reservoir 48 past ball 78c as it is held in place by compression spring 78b. However, when flow of fluid is in a direction out of reservoir 48, the compression 78b is overcome so that the fluid can flow around and past the ball 78c.

Apparatus section 44 controls the movement of a piston 80 within the interior 54a of cylinder 54. Such piston is provided with suitable O-rings 82 to seal the mating surfaces of cylinder 54 and piston 80 and is connected at one end 80a to a shaft 84. The latter is formed with external fastening threads 84a and carries a cup-shaped adjustment member 86. Shaft 84 is formed with an annular ledge or shoulder 84b and a portion 84c of reduced exterior diameter. A pneumatic piston 88 for operation within a pneumatic cylinder 90 having a cavity 90a wherein the piston 88 is permitted to move rectilinearly, as will hereinafter become readily apparent. Such piston comprises cylindrically-shaped reduced portion 88a having a through opening which slidably receives the reduced diameter portion 84c of member 84. The end 84d of member 84 is formed with threads to receive a fastening nut 92 whereby the piston 88 and member 84 operate as a unitary structure.

The adjustment member 86 is formed with a generally cup shape and a pair of oppositely-disposed transverse threaded openings 86a wherein fibrous friction pads 94 are held in frictional engagement with the external fastening threads 84a of member 84 by set screws 96. The latter screws 96 are formed with individual suitable recesses 96a in the ends thereof, respectively, to facilitate tightening or loosening of the fibrous members 94 as they press against the external threads 84a. As shown in FIGS. 1 and 2 of the drawings, the cylindrical surface 86b of cup-shaped member 86 may be provided with certain indicia, as shown at 98, for alignment with a suitable mark on the side of pneumatic cylinder 90 to enable member 86 to be adjusted to the desired setting for controlling the amount of travel of piston 80, as will hereinafter be explained in further detail.

As shown in FIG. 8 of the drawings, the piston 80 is provided with an end portion 80a having an external annular groove 80b. The end 84d of member 84 is formed with a cylindrical end opening or cavity 84e and a pair of parallel, spaced transverse openings 84f, as shown in FIG. 6. A U-shaped connecting member 99 having a pair of parallel legs 99 is slidably positionable within such openings 84f within the annular groove 80b of piston 80. Thus, the connecting member 99 is effective in retaining the piston 80 and member 84 connected in contiguous aligned relation until the connecting member 99 is removed from within the openings 84f and groove 80b, as will hereinafter become more apparent.

Positioned intermediate the apparatus sections 42 and 44 is a T-shaped yoke 100 which is firmly secured to the platform 38 by bolts 102. Such yoke 100 comprises a base portion 104 and an intermediate upstanding portion 106. U-shaped slots 108, 110 and 112 are formed in upright portion 106 of yoke 100, as shown most particularly in FIG. 4 of the drawings. Each of the slots 108 and 112 is formed with a recess 108a and 112a, respectively, which constitutes an elongated counterbore, as shown most particularly in FIGS. 2, 4 and 5 of the drawings. Suitable fastening bolts are positioned in such slots 108 and 112 to threadedly engage the cylinder block 54 to retain the apparatus portion 42 in place, as shown in FIGS. 8, 11, 12 and 14.

Extending through the intermediate U-shaped slot 110 of yoke 100 is the aforedescribed piston 80 which, as will hereinafter appear in greater detail, is operable to move relative to the yoke during movement of piston 80 relative to cylinder 54.

As will hereinafter appear in greater detail, the bolts 114 which fasten the cylinder block 54 to yoke 100 are not tightened to maximum strength but rather are only partially cinched up so that the cylinder 54 can move relative to yoke 100 to enable the nozzle 52 to move slightly to thereby locate properly within the opening 50a of the mold 50. To permit of this, the piston 80, as indicated by the space 110a between the piston and the wall of the U-shaped slot 110 of yoke 100, is free to float or move relative to the yoke while the piston 80 remains in sealed relationship with cylinder block 54 by virtue of the O-rings 82, as shown in detail in FIG. 10 of the drawings.

Slidably mounted within piston 80 and elongated threaded member 84 is a shutoff rod 116, one end 116a of which is generally tapered and rounded as at 116b. Also, end portion 116a of rod 116 is formed with a plurality of flat surfaces 116c to facilitate the passage of fluid material thereabout, as will hereinafter be explained in greater detail. As shown in FIG. 10 of the drawings, rod 116 is provided with O-rings 118 for providing a firm fluid seal between rod 116 and piston 80.

As shown in FIGS. 8, 11 and 12, the shutoff rod 116 loosely fits within the central through opening of member 84. This, as will hereinafter appear in greater detail, enables rod 116 to move laterally to facilitate lateral movement of the nozzle 52 for proper alignment with entry opening 50a of mold 50.

The apparatus section 46 comprises a pneumatic drive mechanism 120 having a cylinder 120a and a piston 120b. The cylinder 120a is mounted on moveable platform 38 through a mounting block 122, there being appropriate mounting bolts (not shown) for that purpose. The piston 120b of pneumatic actuator 120 comprises a central portion 120c which is formed with a through opening for receiving a mounting bolt 124. One end of bolt 124 has a head formed with an annular groove 124a providing a pair of heads 124b and 124c.

The opposite end 124d of bolt 124 is formed with fastening threads to receive a fastening nut 126 whereby the central portion 120c of piston 120b can be firmly secured between head 124b and nut 126, as shown.

The rod 116 extends through member 84 and bolt 124, and is formed with an enlarged end or head 116e which engages the outer surface of head 124c of bolt 124. A centrally-located detent 116f is formed in the head 116e of rod 116.

A yoke, shown most particularly in FIGS. 7 and 14 of the drawings, is provided with a pair of extensions 130 and 130b separated by a space 130c. The extension 130b is bifurcated by virtue of a slot 130d formed in extension 130b, as shown in FIG. 7 of the drawings. The wall of such slot 130d is arcuately shaped so that the extension 130b fits about the bolt 124 within the space 124a between the heads 124b and 124c.

The extension 130a of yoke 130 is formed with an opening 130e for receiving a ball formed of steel or the like which is held in place within opening 130e by an appropriate washer 134 against the force of a compression spring 136. Washer 134 is connected to the extension 130a within opening 130e so that the assembly of the ball and compression spring remains in place. Ball 132 fits within the detent 116f of shutoff rod 116 to retain shut-off rod 116 in place, urging the head 116e of rod 116 against the head 124c of bolt 124.

As hereinabove indicated, each of the pneumatic actuators of apparatus sections 44 and 46 is provided with appropriate pneumatic conduits or hoses 140 for conducting air, under pressure, to and from the respective pneumatic cylinders through appropriate fittings 142, the latter of which enable the air flow to be manually adjusted as desired. Such actuators are controlled in accordance with an appropriate computer (not shown) whereby the proper sequence of operation is afforded, as will hereinafter become apparent.

When it is desired to inject material into the mold 50, the pneumatic operator 36 is appropriately charged with air under pressure in accordance with the controls afforded by the control computer. Thus, air is caused to enter the cylinder of actuator 36 so that the cylinder carries the moveable platform 38 to the left as viewed in FIG. 1 of the drawing. Such motion of platform 38 carries with it the apparatus sections 42, 44 and 46 so that the nozzle 52 is inserted into the recess 50a of mold 50. Any moderate amount of misalignment as nozzle 52 is thus inserted into the mold 50 will be automatically compensated by virtue of lateral movement of cylinder block 54 relative to yoke 100. This, as above explained, is afforded by virtue of the less than tight connection between yoke 100 and block 54 as well as the relatively loose connection afforded by the connection having wire loop 98 between piston 80 and elongated member 84. The nozzle 52 is thereby properly seated within the entry 50a to mold 50.

Then, with shutoff rod 116 in closed position within nozzle 52, as shown most particularly in FIG. 13 of the drawings, the pneumatic actuator 90 is so energized with air as to move the piston 88 thereof from its position in FIG. 11 to its position in FIG. 8. This creates a partial vacuum within the cavity 52b of nozzle 52 and cavity 54a of block 54. The fluid within reservoir 48b is thereby forced into such cavity around the check valve 78. By controlling the amount of movement of piston 88, the precise amount of fluid flows into the aforedescribed cavity so that only the proper amount of such fluid is ultimately injected into the mold.

The amount of movement of piston 88 determines the amount of fluid which flows from the reservoir for ultimate movement into the mold 50. As shown most particularly in FIG. 8 of the drawings, the piston 88 is prevented from moving beyond the position where member 86 engages the cylinder 90. As above explained, if more or less fluid is desired for ultimate passage into the particular mold 50, the member 86 can be adjusted accordingly on threaded member 84. The friction interference between friction pads 94 and fastening threads 84a enables member 86 to be retained in any adjusted position.

Thereafter, by suitable manipulation of the pneumatic actuator of sections 44 and 46, the shutoff rod 116 is retracted by piston 120b from its position as shown in FIG. 12 to its open position as shown in FIG. 8. The fluid material within the cavity behind the nozzle 52 is then forced through the outlet opening 52c of nozzle 52 by piston 80 under the influence of piston 88. Such material flows around the end portion 116a of shutoff rod 116.

As called for by the control computer, namely when the proper quantity of material has been thus injected into mold 50 as defined by piston 88 reaching its position within cylinder 90 as shown in FIG. 12 of the drawings, the piston 120b of actuator 120 drives the end 116a of shutoff rod 116 to its closed position as shown in FIG. 13. By suitable actuation of pneumatic cylinder 36, the entire moveable platform 38 and the various components carried thereby can be retracted from the mold 50.

When the need arises to disassemble the subject fluid injector, as for instance when cleaning or repairs are necessary, it is a simple matter to do so without the ned of special tools or equipment. Initially, the spring-loaded yoke 130 is removed from the double-headed bolt 124 which is part of the apparatus section 46. This is accomplished by manually moving the yoke against the force of compression spring 136 and ball 132 in detent 116f merely by sliding the yoke such that the extension 130b is removed from annular groove 124a of bolt 124. Thereafter, the shutoff rod 116 is slid out of the apparatus by pulling on the head 116d thereof. Thereafter, section 42 can be removed from section 44.

As shown in FIG. 14 of the drawings, apparatus section 42 is disconnected from apparatus section 44 merely by removing the U-shaped retaining member 99 from the position shown in FIG. 6. This enables the piston 80 to be moved away from the elongated member 84.

Thereafter, the apparatus section 42 can be removed from yoke 100 merely by lifting the same upwardly through the U-shaped slots 108, 110 and 112 of yoke 100. Since the bolts 114 are not tightened to maximum strengths they will readily slide through the respective slots in yoke 100.

With the various parts separated as shown in FIG. 14 of the drawings, the parts can be cleaned or repaired as necessary.

Although I have shown and described certain specific embodiments of my invention, I am well aware that many modifications thereof are possible. The invention, therefore, is not to be restricted except insofar as is necessitated by the prior art and by the spirit of the appended claims.

I claim:

1. Injection molding apparatus for injecting fluid material into a mold comprising in combination,
    a moveble platform,
    a nozzle mounted relative to said platform and insertable into an opening in said mold,
    a source of fluid material mounted relative to said nozzle,
    a piston having an elongated opening,
    an elongated shutoff rod within said opening in said piston, and
    a separate actuator for each of said platform, piston and shutoff rod affording predetermined rectilinear movement for each thereof in a predetermined sequence.

2. Injection molding apparatus according to claim 1 wherein the separate actuators for said piston and rod are mounted relative to said platform for movement therewith by the actuator for said platform.

3. Injection molding apparatus according to claim 2 wherein the nozzle is formed with an open interior associated with said source of fluid material, and said piston is moveable by its actuator to alternatively draw fluid material from said source into the open interior of said nozzle and force said material through the opening in the tip of said nozzle, there being a check valve interposed between said source and said nozzle interior to prevent flow of fluid from said interior into said source.

4. Injection molding apparatus according to claim 3 wherein the open interior of said nozzle is formed with a frustoconically-shaped wall and the tip of said shutoff rod is formed with a partial spherical surface for shutoff engagement with the frustoconically-shaped wall and reduced portions adjacent said spherical tip to permit fluid to flow around the tip of said rod when the latter is retracted from its closed position in the tip of said nozzle.

5. Injection molding apparatus for injecting fluid material into a mold comprising in combination,
    a moveable platform,
    a nozzle insertable into an opening in said mold,
    a source of fluid material for providing said material into said nozzle,
    a piston for drawing said fluid material into said nozzle and for moving such material through the opening in said nozzle,
    a shutoff rod,
    actuators for each of said platform, piston and shutoff rod to separately and independently actuate said platform, piston and shutoff rod, and
    quick disconnect means interposed between said nozzle, piston and shutoff rod for ease of cleaning and repair.

* * * * *